(12) United States Patent
Omura et al.

(10) Patent No.: US 9,193,846 B2
(45) Date of Patent: Nov. 24, 2015

(54) GASKET MATERIAL

(75) Inventors: Atsushi Omura, Shizuoka (JP);
Kenichirou Ishikawa, Shizuoka (JP);
Hideharu Aoyagi, Shizuoka (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 12/900,076

(22) Filed: Oct. 7, 2010

(65) Prior Publication Data

US 2011/0089646 A1    Apr. 21, 2011

(30) Foreign Application Priority Data

Oct. 7, 2009   (JP) ................. 2009-233565

(51) Int. Cl.
*F16J 15/12*   (2006.01)
*C08K 5/33*    (2006.01)
*C08K 5/32*    (2006.01)
*C08J 9/10*    (2006.01)
*C08J 9/32*    (2006.01)

(52) U.S. Cl.
CPC ... *C08K 5/33* (2013.01); *C08J 9/10* (2013.01); *C08J 9/32* (2013.01); *C08K 5/32* (2013.01); *C08J 2321/00* (2013.01)

(58) Field of Classification Search
USPC ......................................... 428/323, 457, 462
See application file for complete search history.

(56) References Cited

U.S. PATENT DOCUMENTS

| | | | |
|---|---|---|---|
| 4,173,556 A | 11/1979 | Coran et al. | |
| 2004/0006170 A1 | 1/2004 | Haftka et al. | |
| 2005/0249935 A1* | 11/2005 | Saito et al. | 428/304.4 |
| 2007/0087157 A1* | 4/2007 | Saito et al. | 428/66.4 |
| 2008/0207786 A1 | 8/2008 | Suzuki et al. | |
| 2011/0046290 A1* | 2/2011 | Toyoda et al. | 524/525 |

FOREIGN PATENT DOCUMENTS

| | | |
|---|---|---|
| CN | 1951686 | 4/2007 |
| EP | 1 342 751 A1 | 9/2003 |
| GB | 1 533 227 | 11/1978 |
| JP | 5-117479 | 5/1993 |
| JP | 07-305905 | 11/1995 |
| JP | 10-237423 | 9/1998 |
| JP | 2003-268163 | 9/2003 |
| JP | 2005-201302 | 7/2005 |
| JP | 2007-083733 | 4/2007 |
| JP | 2008-208256 | 9/2008 |
| WO | WO 2009/110562   * | 9/2009 |

OTHER PUBLICATIONS

British Search Report in GB 1016920.9 dated Jan. 26, 2011.
Office Action from related Chinese Application No. 201010503337.6; Issuing Date: Sep. 17, 2013; in Chinese with English Translation; 14 pages.
Office Action in related Japanese Application No. 2010-227696; Dated Apr. 1, 2014; 3 pages.

* cited by examiner

*Primary Examiner* — Ronak Patel
(74) *Attorney, Agent, or Firm* — Nixon & Vanderhye P.C.

(57) ABSTRACT

A gasket material including a steel plate and a foamed rubber layer formed on one or both sides of the steel plate, in which the foamed rubber layer is obtained from a rubber composition containing at least one of NBR, H-NBR or a functional group-modified NBR, as a rubber compound; and a crosslinking agent, and in which the foamed rubber layer has a quinoid crosslinking structure.

13 Claims, No Drawings

GASKET MATERIAL

TECHNICAL FIELD

The present invention relates to a gasket material suitable for electric components and the like.

BACKGROUND ART

There have hitherto been used gasket materials having a steel plate and a foamed rubber layer comprising NBR, H-NBR or functional group-modified NBR, which is formed on one or both sides of the steel plate. Such gasket materials have many air bubbles in the foamed rubber layer, so that they have a high compressibility compared with gasket materials in which a non-foamed rubber layer is formed. Accordingly, such gasket materials are excellent in sealing properties for flanges having a high surface roughness or in sealing under low surface pressure, and therefore become the mainstream at present.

Further, NBR, H-NBR or functional group-modified NBR is generally crosslinked with sulfur or peroxide. However, it is difficult to perform a peroxide crosslinking in the atmosphere, unlike a sulfur crosslinking, so that the peroxide crosslinking is unsuitable for crosslinking in an oven, which is usually performed. The sulfur crosslinking is therefore generally performed also in the gasket materials (for example, see Patent Document 1). However, sulfur is liberated from the foamed rubber layer in some cases. In particular, when the gasket materials are used in electric components, there is a possibility of corroding metals which form the components or metal parts in the peripheries thereof.

Furthermore, in recent years, there are being popularized hybrid cars in which an engine and an electric motor are combined as power sources and electric cars driven by only an electric motor. However, when the gasket material with the sulfur-crosslinked foamed rubber layer formed is used in the electric components such as an alternator, it is presumed that liberated sulfur corrodes the metal components of the electric motor.

Patent Document 1: JP-A-2003-268163

SUMMARY OF THE INVENTION

The invention has been made in view of such a situation, and an object thereof is to provide a gasket material capable of good sealing without the possibility of causing metal corrosion even when used in electric components, with respect to a gasket material in which a foamed rubber layer composed of NBR, H-NBR or functional group-modified NBR is formed.

In order to achieve the above object, the present invention provides the following gasket materials.

(1) A gasket material comprising a steel plate and a foamed rubber layer formed on one or both sides of the steel plate,
wherein the foamed rubber layer is obtained from a rubber composition containing: at least one of NBR, H-NBR or functional group-modified NBR, as a rubber compound; and a crosslinking agent, and
wherein the foamed rubber layer has a quinoid crosslinking structure.

(2) The gasket material according to the above (1), wherein the crosslinking agent comprises at least one selected from the group consisting of p-quinone dioxime, p, p'-dibenzoylquinone dioxime and poly-p-dinitrobenzene.

(3) The gasket material according to the above (1) or (2), wherein the rubber composition further contains at least one selected from the group consisting of lead oxide, copper oxide, manganese oxide, magnesium oxide, N,N'-m-phenylenedimaleimide and graphite, as a crosslinking accelerator.

(4) The gasket material according to any one of the above (1) to (3), wherein the rubber composition further contains at least one selected from the group consisting of: a DPT-based, ADCA-based and HDCA-based thermal decomposition type foaming agent; and non-crosslinkable and thermally expansible microcapsules, as a foaming agent.

(5) The gasket material according to any one of the above (1) to (4), wherein the foamed rubber layer has a thickness before foaming of 10 to 200 μm and an expansion ratio of 1.5 to 5.0.

(6) The gasket material according to any one of the above (1) to (5), which is a gasket material for an electric component.

According to the invention, in a gasket material in which a foamed rubber layer comprising at least one of NBR, H-NBR or functional group-modified NBR is formed, liberation of sulfur from the gasket material can be eliminated by obtaining the foamed rubber layer by subjecting to quinoid crosslinking. Therefore, metal corrosion can be prevented even when used in electric components and good sealing properties can be maintained.

MODE FOR CARRYING OUT THE INVENTION

The invention will be described in detail below.

The gasket material of the invention comprising a steel plate and a foamed rubber layer, in which the foamed rubber layer is obtained from a rubber composition containing at least on of NBR, H-NBR or functional group-modified NBR, is formed on one or both sides of the steel plate, and the foamed rubber layer has a quinoid crosslinking structure in place of a sulfur crosslinking structure.

The quinoid crosslinking can be performed to NBR, H-NBR and every kind of functional group-modified NBR (these rubbers are hereinafter generically named "NBR"). As crosslinking agents used is preferably at least one crosslinking agent selected from the group consisting of p-quinone dioxime, p, p'-dibenzoylquinone dioxime and poly-p-dinitrobenzene. The added amount of these crosslinking agents is preferably from 0.5 to 50.0 parts by mass, and more preferably from 2.0 to 15.0 parts by mass, based on 100 parts by mass of NBR. Further, these quinoid-based crosslinking agents may be used either alone or in combination of two or more thereof.

Further, in order to efficiently perform the crosslinking, a crosslinking accelerator is preferably used together. For example, at least one selected from the group consisting of lead oxide, copper oxide, manganese oxide, magnesium oxide, N,N'-m-phenylenedimaleimide or graphite is used together. For the added amount of these crosslinking accelerators, the lower limit thereof is an amount for achieving an effect of accelerating the crosslinking, and the upper limit thereof is an amount not causing excessive crosslinking. Specifically, in the case of lead oxide, copper oxide or manganese oxide, the added amount thereof is preferably from 0.1 to 20 parts by mass, and more preferably from 0.5 to 5 parts by mass, based on 100 parts by mass of NBR. In the case of magnesium oxide, it is preferably from 0.5 to 25 parts by mass, and more preferably from 1 to 5 parts by mass, based on 100 parts by mass of NBR. In the case of N,N'-m-phenylenedimaleimide, it is preferably from 0.1 to 30 parts by mass, and more preferably from 0.3 to 5 parts by mass, based on 100 parts by mass of NBR. Incidentally, lead oxide, copper oxide, manganese oxide, magnesium oxide and N,N'-m-phenylenedimaleimide may be used either alone or as in combination of two or more thereof. In the case of graphite, the added amount thereof is preferably from 3 to 25 parts by mass, and more preferably from 5 to 10 parts by mass, based on 100 parts by mass of NBR.

At least one selected from the group consisting of a thermal decomposition type foaming agent and non-crosslinkable, thermally expansible microcapsules is preferably incorporated in NBR for foaming. Preferred examples of the thermal decomposition type foaming agents include DPT-based, ADCA-based and HDCA-based foaming agents. Further, one having a decomposition temperature of 120° C. or more is preferred, and one having a decomposition temperature of 150 to 210° C. is most preferred. The amount thereof incorporated is preferably from 1 to 100 parts by mass, and more preferably from 3 to 30 parts by mass, based on 100 parts by mass of NBR. The non-crosslinkable, thermally expansible microcapsules are preferably ones including a hydrocarbon in the resin. The amount thereof incorporated is preferably from 0.5 to 30 parts by mass, and more preferably from 1 to 20 parts by mass, based on 100 parts by mass of NBR.

Incidentally, crosslinkable microcapsules are unfavorable because crosslinking proceeds at the time of heating, resulting in a failure to obtain a high expansion ratio.

In view of sealing properties, the expansion ratio of the foamed rubber layer is preferably from 1.4 to 10, and more preferably from 1.5 to 5.0. Incidentally, the expansion ratio is the ratio of the thickness of the rubber layer after foaming to the thickness thereof before foaming, and determined from the following equation:

Expansion ratio=[(thickness of rubber layer after foaming)/(thickness of rubber layer before foaming)]

Further, a filler can also be incorporated in NBR for reinforcement. As the filler, carbon black is preferred. The filler is incorporated in an amount of preferably 5 to 100 parts by mass, more preferably 10 to 70 parts by mass, based on 100 parts by mass of NBR.

Besides, additives usually incorporated, such as an antioxidant, may be incorporated in NBR in an appropriate amount.

For producing the gasket material of the invention, the above-mentioned crosslinking agent, crosslinking accelerator, foaming agent, filler and other additives may add to NBR in specific amounts to prepare a rubber compound, the rubber compound is dissolved or dispersed in an organic solvent to prepare a coating solution, and the coating solution is applied to the steel plate, followed by foaming. Although the organic solvent is not limited, example thereof includes a mixture of an aromatic hydrocarbon-based solvent such as toluene or a ketone-based solvent and an ester-based solvent in an arbitrary mixing ratio of from 10:90 to 90:10. Then, the rubber compound is dissolved or dispersed in this organic solvent to a solid concentration of 10 to 60% by mass to prepare the coating solution.

Although there is also no limitation on the method for applying the coating solution, a method of being able to control the coating thickness is preferred. It is suitable to use a clearance coater, a roll coater or the like. The coating thickness is preferably from 10 to 200 μm, and more preferably from 20 to 150 μm.

Thereafter, the foaming agent is foamed by performing heat treatment under foaming conditions of the foaming agent, for example, at about 150° C. to 240° C. for about 5 to 15 minutes, to thereby form the foamed rubber layer. In that case, the foaming conditions such as the foaming agent to be used, the heating temperature and the heating time are adjusted so that the above-mentioned expansion ratio is achieved.

Kinds of the steel plate are not limited, and there can be used a steel plate which has been conventionally used in the gasket material, such as a stainless steel plate (ferrite-based/martensite-based/austenite-based stainless steel), a SPCC steel plate or an aluminum steel plate. These steel plates may be subjected to a chemical conversion treatment for forming a rust preventive film with a chromate treating agent, a non-chromate treating agent or the like, after alkali degreasing. Further, a zinc phosphate or iron phosphate film is formed on the SPCC steel plate in some cases. A similar film may be formed also in the invention. Furthermore, a steel plate whose surface is roughened by shot blast, Scotch blast or the like can also be used.

The gasket material thus obtained has a high network chain density, as shown in Examples described later.

Examples

The invention will be described with reference to Examples and Comparative Examples, but should not be construed as being limited thereto in any way.

(Preparation of Samples)

Rubber compounds each obtained by blending a rubber material, a filler, a crosslinking agent, a cross linking accelerator and a foaming agent were each dissolved or dispersed in a mixed organic solvent, obtained by mixing toluene with ethyl acetate in a mixing ratio of 7:3, to a solid concentration of 28.5% by mass to prepare coating solutions. A primer treatment was performed on stainless steel plates subjected to a non-chromium treatment, and the coating solutions were each applied to the steel plates by roll coater, respectively, followed by heat treatment at 210° C. for 10 minutes, thereby obtaining samples. In the Table 1, added amount is shown in parts by mass based on 100 parts by mass of DN3350.

TABLE 1

Rubber Formulation

| Component | | Composition (main component) | Manufactured By |
|---|---|---|---|
| DN3350 | Nitrile Rubber | | |
| Stearic Acid | | | |
| Zinc Oxide | | | |
| MT Carbon | Carbon Black | | |
| Nocrac PA | Antioxidant | Phenyl-1-naphthylamine | A |
| Sulfur | Crosslinking | | |
| Balnoc DGM | Agent | p-p'-Benzoyl quinone dioxime | A |
| Balnoc GM-P | | p-Quinone dioxime | A |
| Balnoc DNB | | 25% Poly-p-dinitrobenzene | A |
| Balnoc R | | 4-4'-Dithiodimorphrine | A |

TABLE 1-continued

Rubber Formulation

| | | | |
|---|---|---|---|
| Nocceler CZ | Crosslinking Accelerator | N-Cyclohexyl-2-benzothiazoly 1 sulfenamide | A |
| Nocceler TBT | | Tetrabutylthiuram disulfide | A |
| Balnoc PM | | N-N'-m-phenylene dimaleimide | A |
| Sanceler MG | | 2-Mercaptobenzothiazole | B |
| Lead Oxide | | | |
| Manganese Oxide | | | |
| Copper Oxide | | | |
| Graphite | | | |
| Celmike A (Thermal Decomposition Type) | Foaming Agent | Azodicarbonamide | C |
| CAP 250 (Thermal Decomposition Type) | | Azodicarbonamide + urea | C |
| DU-40 (Non-Crosslinkable Microcapsules) | | Undisclosed by manufacturer | D |

| | | Quinoid Crosslinking | | | | | | |
|---|---|---|---|---|---|---|---|---|
| Component | | Composition (1) | Composition (2) | Composition (3) | Composition (4) | Composition (5) | Composition (6) | Composition (7) |
| DN3350 | Nitrile Rubber | 100 | 100 | 100 | 100 | 100 | 100 | 100 |
| Stearic Acid | | 1 | 1 | 1 | 1 | 1 | 1 | 1 |
| Zinc Oxide | | 5 | 5 | 5 | 5 | 5 | 5 | 5 |
| MT Carbon | Carbon Black | 50 | 50 | 50 | 50 | 50 | 50 | 50 |
| Nocrac PA | Antioxidant | 5 | 5 | 5 | 5 | 5 | 5 | 5 |
| Sulfur | Crosslinking Agent | | | | | | | |
| Balnoc DGM | | 5 | 10 | | | | | 10 |
| Balnoc GM-P | | | | | 8 | 10 | 10 | |
| Balnoc DNB | | | | 10 | | | | |
| Balnoc R | | | | | | | | |
| Nocceler CZ | Crosslinking Accelerator | | | | | | | |
| Nocceler TBT | | | | | | | | |
| Balnoc PM | | | | | | | | |
| Sanceler MG | | | | | | | | |
| Lead Oxide | | | | | | | | |
| Manganese Oxide | | | | | | | | |
| Copper Oxide | | | | | | | 2 | |
| Graphite | | | | | | | | 2 |
| Celmike A (Thermal Decomposition Type) | Foaming Agent | 30 | 30 | | 10 | | | |
| CAP 250 (Thermal Decomposition Type) | | | | 30 | | | | 15 |
| DU-40 (Non-Crosslinkable Microcapsules) | | | | | | 10 | 5 | |

| | | Quinoid Crosslinking | | Quinoid Crosslinking | Bismaleimide Crosslinking |
|---|---|---|---|---|---|
| Component | | Composition (8) | Composition (9) | Composition (10) | Composition (11) |
| DN3350 | Nitrile Rubber | 100 | 100 | 100 | 100 |
| Stearic Acid | | 1 | 1 | 1 | 1 |
| Zinc Oxide | | 5 | 5 | 5 | 5 |
| MT Carbon | Carbon Black | 50 | 50 | 50 | 50 |
| Nocrac PA | Antioxidant | 5 | 5 | 5 | 5 |
| Sulfur | Crosslinking Agent | | | | |
| Balnoc DGM | | 5 | | 10 | |
| Balnoc GM-P | | | 8 | | |
| Balnoc DNB | | | | | |
| Balnoc R | | | | | |
| Nocceler CZ | Crosslinking Accelerator | | | | |
| Nocceler TBT | | | | | |
| Balnoc PM | | | | 3 | 10 |
| Sanceler MG | | | | | |
| Lead Oxide | | | | | |
| Manganese Oxide | | | 3 | | |
| Copper Oxide | | | | | |
| Graphite | | | | | |
| Celmike A (Thermal Decomposition Type) | Foaming Agent | 12 | 10 | | 30 |
| CAP 250 (Thermal Decomposition Type) | | | | | |
| DU-40 (Non-Crosslinkable Microcapsules) | | | | | |

TABLE 1-continued

| | | Rubber Formulation | |
|---|---|---|---|
| Component | | Dithiodimorpholine-Based Crosslinking Agent Composition (12) | Sulfur Crosslinking Composition (13) |
| DN3350 | Nitrile Rubber | 100 | 100 |
| Stearic Acid | | 1 | 1 |
| Zinc Oxide | | 5 | 5 |
| MT Carbon | Carbon Black | 50 | 50 |
| Nocrac PA | Antioxidant | 5 | 5 |
| Sulfur | Crosslinking Agent | | 2 |
| Balnoc DGM | | | |
| Balnoc GM-P | | | |
| Balnoc DNB | | | |
| Balnoc R | | 1 | |
| Nocceler CZ | Crosslinking Accelerator | 1 | 2 |
| Nocceler TBT | | 4 | |
| Balnoc PM | | | |
| Sanceler MG | | | |
| Lead Oxide | | | |
| Manganese Oxide | | | |
| Copper Oxide | | | |
| Graphite | | | |
| Celmike A (Thermal Decomposition Type) | Foaming Agent | 30 | |
| CAP 250 (Thermal Decomposition Type) | | | 24 |
| DU-40 (Non-Crosslinkable Microcapsules) | | | |

A: OUCHI SHINKO CHEMICAL INDUSTRIAL CO., LTD
B: SANSHIN CHEMICAL INDUSTRY CO., LTD.
C: Sankyo kasei Co., Ltd.
D: Japan Fillite Co., Ltd.

Then, the following evaluations were performed on the respective samples. The results thereof are shown in Table 2.

(Evaluation Methods)

(1) Expansion Ratio

The thickness of the rubber layer before foaming and the thickness of the rubber layer after foaming were measured with a micrometer, and the expansion ratio was calculated from the following equation:

Expansion ratio=[(thickness of rubber layer after foaming)/(thickness of rubber layer before foaming)]

(2) Measurement of Network Chain Density

The foamed rubber layer was cut out to a size of 10 mm square, and the area thereof was measured (the area before swelling in dioxane solution). Thereafter, the foamed rubber layer cut was immersed in dioxane solution for 5 minutes and taken out. Then, the area swollen was calculated (the area after swelling in dioxane solution (the area after swelling in dioxane solution). The area before swelling in dioxane solution and the area after swelling in dioxane solution were substituted in the Flory-Rehner equation to determine the network chain density of the rubber.

(3) Amount of Sulfur Contained

The amount of residual sulfur was measured by using combustion ion chromatography.

TABLE 2

| | | Evaluation Results | | | | |
|---|---|---|---|---|---|---|
| | Formulation (Table 1) | Thickness of Rubber before Foaming (μm) | Thickness of Rubber after Foaming (μm) | Expansion Ratio | Network Chain Density (mol/cm$^3$) | Amount of Sulfur Contained (wt %) |
| Example 1 | Composition (1) | 80 | 224 | 2.8 | 0.032 | 0.08 |
| Example 2 | Composition (2) | 100 | 290 | 2.9 | 0.061 | 0.07 |
| Example 3 | Composition (3) | 100 | 250 | 2.5 | 0.057 | 0.02 |
| Example 4 | Composition (4) | 70 | 217 | 3.1 | 0.048 | 0.04 |
| Example 5 | Composition (5) | 90 | 468 | 5.2 | 0.063 | 0.06 |
| Example 6 | Composition (6) | 50 | 180 | 3.6 | 0.088 | 0.05 |
| Example 7 | Composition (7) | 120 | 372 | 3.1 | 0.082 | 0.06 |
| Example 8 | Composition (8) | 50 | 165 | 3.3 | 0.055 | 0.07 |
| Example 9 | Composition (9) | 70 | 395 | 5.6 | 0.091 | 0.07 |
| Comparative Example 1 | Composition (10) | 65 | 65 | 1.0 | 0.059 | 0.08 |
| Comparative Example 2 | Composition (11) | 60 | 210 | 3.5 | 0.008 | 0.05 |
| Comparative Example 3 | Composition (12) | 70 | 161 | 2.3 | 0.052 | 1.01 |

TABLE 2-continued

| | Formulation (Table 1) | Thickness of Rubber before Foaming (μm) | Thickness of Rubber after Foaming (μm) | Expansion Ratio | Network Chain Density (mol/cm$^3$) | Amount of Sulfur Contained (wt %) |
|---|---|---|---|---|---|---|
| | | Evaluation Results | | | | |
| Comparative Example 4* | Composition (13) | 100 | 230 | 2.3 | 0.062 | 2.10 |

*Note 1): A conventional foamed gasket material using sulfur

From Table 2, it is known that the foamed rubber layers obtained by the quinoid crosslinking according to the invention are excellent in sealing properties required for the gasket material, and do not substantially produce free sulfur. Incidentally, sulfur detected in Examples was caused by contamination in the course of preparation of the rubber.

While the present invention has been described in detail and with reference to specific embodiments thereof, it will be apparent to one skilled in the art that various changes and modifications can be bade therein without departing from the spirit and scope thereof.

This application is based on Japanese patent application No. 2009-233565 filed on Oct. 7, 2009, and the entire contents of which are incorporated hereinto by reference. All references cited herein are also incorporated in their entirety.

What is claimed is:

1. A gasket material comprising a steel plate and a foamed rubber layer formed on one or both sides of the steel plate,
   wherein the foamed rubber layer is obtained from a rubber composition consisting of at least one of NBR, H-NBR or functional group-modified NBR, as a rubber compound; a quinoid-based crosslinking agent; a foaming agent; optionally stearic acid; optionally zinc oxide; optionally carbon black; optionally an antioxidant; and optionally a crosslinking accelerator;
   wherein the foamed rubber layer has a quinoid crosslinking structure and a thickness before foaming of 70 μm to 200 μm.

2. The gasket material according to claim 1, wherein the crosslinking agent comprises at least one selected from the group consisting of p-quinone dioxime, p,p'-dibenzoylquinone dioxime and poly-p-dinitrobenzene.

3. The gasket material according to claim 1, wherein the foaming agent is at least one selected from the group consisting of: a DPT-based, ADCA-based and HDCA-based thermal decomposition type foaming agent; and non-crosslinkable and thermally expansible microcapsules.

4. The gasket material according to claim 1, wherein the foamed rubber layer has an expansion ratio of 1.5 to 5.0.

5. The gasket material according to claim 1, which is a gasket material for an electric component.

6. The gasket material according to claim 1, wherein the rubber composition is consisting of at least one of NBR, H-NBR or functional group-modified NBR, as a rubber compound; a quinoid-based crosslinking agent; a foaming agent; a crosslinking accelerator; optionally stearic acid; optionally zinc oxide; optionally carbon black; and optionally an antioxidant and wherein the crosslinking accelerator comprises at least one selected from the group consisting of lead oxide, copper oxide, manganese oxide, magnesium oxide, N,N'-m-phenylenedimaleimide and graphite.

7. The gasket material according to claim 1, wherein the foamed rubber layer has a thickness before foaming of 80 μm to 200 μm.

8. The gasket material according to claim 1, wherein the rubber composition is consisting of at least one of NBR, H-NBR or functional group-modified NBR, as a rubber compound; a quinoid-based crosslinking agent; a foaming agent; carbon black; optionally stearic acid; optionally zinc oxide; optionally an antioxidant; and optionally a crosslinking accelerator.

9. The gasket material according to claim 1, wherein the rubber composition is consisting of at least one of NBR, H-NBR or functional group-modified NBR, as a rubber compound; a quinoid-based crosslinking agent; a foaming agent; zinc oxide; carbon black; optionally stearic acid; optionally an antioxidant; and optionally a crosslinking accelerator.

10. The gasket material according to claim 1, wherein the rubber composition is consisting of at least one of NBR, H-NBR or functional group-modified NBR, as a rubber compound; a quinoid-based crosslinking agent; a foaming agent; zinc oxide; carbon black; an antioxidant; optionally stearic acid; and optionally a crosslinking accelerator.

11. The gasket material according to claim 1, wherein the rubber composition is consisting of at least one of NBR, H-NBR or functional group-modified NBR, as a rubber compound; a quinoid-based crosslinking agent; a foaming agent; stearic acid; zinc oxide; carbon black; an antioxidant; and optionally a crosslinking accelerator.

12. The gasket material according to claim 1, wherein the rubber composition is consisting of at least one of NBR, H-NBR or functional group-modified NBR, as a rubber compound; a quinoid-based crosslinking agent; a foaming agent; a crosslinking accelerator; optionally stearic acid; optionally zinc oxide; optionally carbon black; and optionally an antioxidant.

13. The gasket material according to claim 1, wherein the rubber composition consists NBR as the rubber compound.

* * * * *